Aug. 11, 1964         A. J. PETZINGER         3,144,603
LONG SCALE MOVING COIL ELECTRICAL MEASURING INSTRUMENT
      WITH ADDITIONAL FLUX AUGMENTING MAGNET
              MEANS IN THE AIR GAP
             Filed Feb. 6, 1961

WITNESSES:
Bernard R. Gieguay

INVENTOR
Ambrose J. Petzinger
BY John L. Stoughton
ATTORNEY

UNITED STATES PATENT OFFICE — 3,144,603 — Patented Aug. 11, 1964

3,144,603
LONG SCALE MOVING COIL ELECTRICAL MEASURING INSTRUMENT WITH ADDITIONAL FLUX AUGMENTING MAGNET MEANS IN THE AIR GAP
Ambrose J. Petzinger, Glen Rock, N.J., assignor to Westinghouse Electric Corporation, East Pittsburgh, Pa., a corporation of Pennsylvania
Filed Feb. 6, 1961, Ser. No. 87,321
4 Claims. (Cl. 324—150)

This invention relates generally to permanent magnet devices, and more particularly to a permanent magnet electrical instrument of the moving coil concentric magnet type.

A primary object of this invention is to provide a new and improved magnetic flux circuit.

Another object of this invention is to provide a moving coil concentric magnet electrical instrument with a substantially even scale distribution.

A further object is to provide a permanent magnet type of device having a substantially even distribution of flux across an arcuate gap throughout the working range of the device.

A still further object is to provide means to compensate for uneven flux distribution at the extremes of the working range of the magnetic device.

A still further object is to provide such a distribution by the addition of low permeability and high coercive force magnets adjacent the end portions of the main permanent magnet to reduce the effect of leakage flux from the main magnet.

Other objects will be apparent from the claims, the specification, and the drawings, in which:

Figure 1:
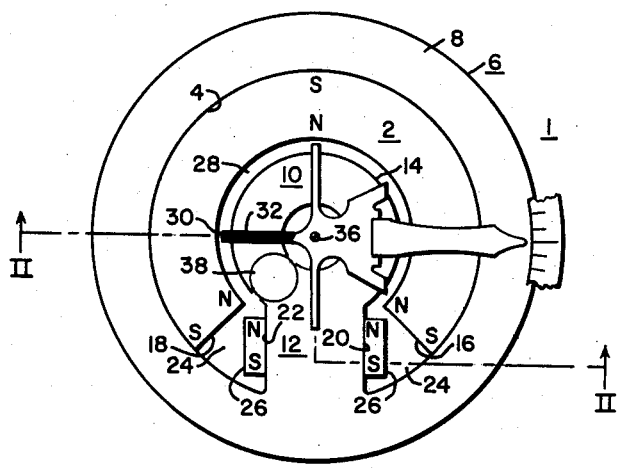
FIGURE 1 is a top plan view of an electrical instrument embodying the teachings of the invention.
Figure 2:
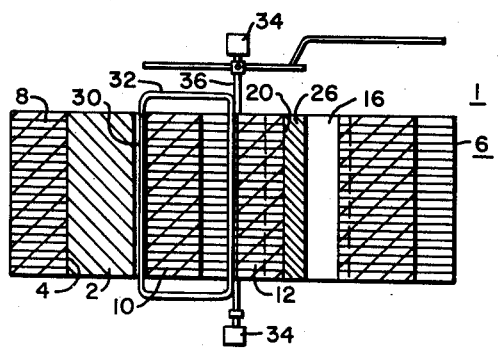
FIGURE 2 is a view taken substantially along the line II—II of FIGURE 1 and looking in the direction of the arrows.

Referring to the drawings by characters of reference, the numeral 1 indicates generally an electrical measuring instrument of the long scale (of the order of 240°) moving coil instrument of the concentric magnet type. As shown therein, the instrument 1 includes a source of magnetomotive force comprising a substantially C-shaped permanent magnet 2 of high permeability and high coercive force as for example one of the alnicos. The magnet 2 is preferably of substantially C-shaped configuration. Its outer arcuate surface seats against the inward arcuate surface 4 of a flux conducting structure 6 which comprises an outer ring-like portion 8 and an inner ring-like portion 10 joined together by a neck portion 12 which connects the portions so that the outer surface 14 of the inner portion 10 is concentrically arranged with respect to the inner surface 4 of the outer portion 8. The magnet 2 is of constant radial dimension and is polarized as indicated in a radial direction with one arcuate surface thereof of one polarity and the other arcuate surface thereof adjacent the surface 4 of a second polarity. The end portions 16 and 18 of the magnet 2 terminate in spaced relation to the side walls 20 and 22 of the neck portion 12 to provide gaps 24 therebetween to permit the insertion of low permeability and high coercive force permanent magnets 26.

The distance between the outer surface 14 of the portion 10 and the inner surface 4 of the portion 8 is greater than the radial dimension of the magnet 2 to provide an arcuate gap 28 through which the coil side 30 of a movable coil 32 moves. The coil 32 is held for arcuate movement of its coil side 30 in the gap 28 by means of a pair of upper and lower supports 34 which position a shaft 36 at the axis of curvature of the surfaces 4 and 14. The inner portion 10 is provided with a gap through which the coil 32 may be inserted into its shown position and which gap is subsequently closed by means of a plug 38.

The instrument so far described is similar to the one shown and claimed in the Lunas Patent No. 2,959,736 dated November 8, 1960. This patent describes and claims a core structure having a circularly cylindrical aperture through which a coil may be inserted and which aperture is subsequently closed by a circularly cylindrical pin similar to the pin 38. Flux from the magnet 2 passes across the gap 28 through the inner section 10, the neck portion 12, and the ring-like portion 8 back to the other pole of the magnet. By proper magnetization of the permanent magnet 2, a substantially constant flux strength may be maintained throughout the major length of the gap 28. At the ends of the magnet 2 adjacent the neck portion 12, the flux tends to decrease somewhat because of the flux leakage from magnet 2 to the neck portion 12 and the outer member 8. This leakage may, to a large degree, be eliminated by the magnets 26 to provide a substantially constant magnitude of flux density throughout the length of the gap 28 through which the coil side 30 of the coil 33 moves.

The high coercive force permanent magnets 26 are polarized in a radial direction with respect to the axis of the surfaces 4 and 14 and of the gap 28 and are polarized in the same polarity as is the magnet 2. These magnets 26 are secured to the adjacent surfaces 20 and 22 of the neck portion 12 and reduce the flow of leakage flux from the end portions of the magnet 2, thereby insuring a substantially linear movement of the coil 32 with respect to magnitude of the current flowing therethrough.

While in the generic sense the magnets 26 may be of any suitable material, ceramic magnets fabricated from a material having the general formula $MO_6Fe_2O_3$ wherein M represents barium, strontium, or lead are preferred. The material $BaO_6Fe_2O_3$ is commercially available and is satisfactory. Such a magnet may have a coercive force in excess of 1500 oersteds and will have a very low permeability and will not readily demagnetize.

It will be appreciated that the structure 8 may be either of solid or laminated material and that the neck portion 12 should be of sufficient area to carry the total flux of the magnets 2 and 26 without excessive saturation, so that the major portion of the flux will be confined to the iron path and will not tend to short cut through the gaps 24. It should further be noted that the space between the ends of the magnet 2 and the neck portion 12 must not be too short so that the flux therefrom will have a greater tendency to flow across the gap 28 to the inner portion 10 than to flow directly to the neck portion 12.

Although the invention has been described with reference to certain specific embodiments thereof, numerous modifications are possible and it is desired to cover all modifications falling within the spirit and scope of the invention.

What is claimed and is desired to be secured by United States Letters Patent is as follows:

1. In a moving coil instrument of the concentric magnet type, inner and outer ring-like elements of non-permanent magnetic material, a connecting member of non-permanent magnetic material joining said elements and holding the same in concentric spaced relation to form a C-shaped gap therebetween, a main C-shaped permanent magnet located in said gap, said magnet being magnetized to provide a flux field across said gap in a first polarity and being of lesser length than the length of said gap and spaced in said gap to provide in said gap an end space between said member and each end of said magnet, and a pair of auxiliary magnets, said auxiliary magnets being of lesser volume than said main magnets and having a greater coercive force than said main magnet, said auxiliary magnets being individually located in said end spaces intermediate said main magnet and said connecting member, said auxiliary magnets being magnetized to establish flux fields across said gap in said one polarity.

2. In a moving coil instrument of the concentric magnet type, inner and outer ring-like elements of non-permanent magnetic material, a connecting member of non-permanent magnetic material joining said elements and holding the same in concentric spaced relation to form a C-shaped gap therebetween, a main C-shaped permanent magnet of high permeability located in said gap, said magnet being polarized to provide a flux field across said gap in a first polarity and being of lesser length than the length of said gap to provide in said gap an end space between said member and each end of said magnet, and a pair of auxiliary magnets, said auxiliary magnets being of lesser volume than said main magnet and of lesser permeability than said main magnet and being individually located in said end spaces intermediate said main magnet and said connecting member, said auxiliary magnets being magnetized to establish flux fields across said gap in said one polarity.

3. In a moving coil instrument of the concentric magnet type, inner and outer ring-like elements of non-permanent magnetic material, a connecting member of non-permanent magnetic material joining said elements and holding the same in concentric spaced relation about an axis of rotation to form a C-shaped circumferentially extending gap therebetween, a main C-shaped radially magnetized permanent magnet of high permeability located in said gap and having an outer surface seating against the inner peripheral surface of said outer element, said magnet being of lesser length than the length of said gap and spaced in said gap to provide an end gap between said member and each end of said magnet the lengths of said end gaps being so related to the cross-section of said connecting member that subsantially all of the flux of said main magnet will pass through said connecting member without short cutting through said end gaps, and a pair of auxiliary magnets, said auxiliary magnets being of lesser volume than said main magnet and individually located in said end gaps, said auxiliary magnets being magnetized to establish flux fields across said C-shaped gap and in the same polarity as said C-shaped magnet, said auxiliary magnets having a permeability less than that of said main magnet and a coercive force sufficient to prevent said auxiliary magnets from being readily demagnetized by said main magnet.

4. In a moving coil instrument of the concentric magnet type, inner and outer ring-like elements of non-permanent magnetic material, a neck member of non-permanent magnetic material joining said elements and supporting said inner element concentric with respect to said outer element, said elements having adjacent but spaced arcuate surfaces, an arcuately shaped high permeability main permanent magnet seating against one of said arcuate surfaces and being spaced from the other of said arcuate surfaces to define an arcuate gap, said main magnet being polarized to establish a flux field of a first polarity between said arcuate surfaces and across said arcuate gap, and a plurality of auxiliarly permanent magnets, said auxiliary magnets being of lesser volume than said main magnet and being of low permeability and high coercive force relative to said main magnet and located intermediate the end portions of said main magnet and said neck member, said auxiliary magnets being polarized in a direction to establish a flux field between said arcuate surfaces in said first polarity.

References Cited in the file of this patent
UNITED STATES PATENTS

| | | |
|---|---|---|
| 2,102,409 | Faus | Dec. 14, 1937 |
| 2,697,204 | Otzmann | Dec. 14, 1954 |
| 2,865,002 | Triplett | Dec. 16, 1958 |
| 2,959,736 | Lunas | Nov. 8, 1960 |